United States Patent [19]

Perry

[11] Patent Number: 4,857,374

[45] Date of Patent: Aug. 15, 1989

[54] STRUCTURALLY STRONG, NON VAPOR, NON MOISTURE ABSORBING, SPA/HOT TUB COVER

[76] Inventor: Gary L. Perry, 19007 105th St. Ct. E., Sumner, Wash. 98390

[21] Appl. No.: 272,513

[22] Filed: Nov. 15, 1988

[51] Int. Cl.[4] .............................................. B32B 3/26

[52] U.S. Cl. .............................................. 428/71; 4/498; 428/247; 428/314.4; 428/316.6; 428/317.1

[58] Field of Search ............... 4/498; 428/71, 76, 247, 428/314.4, 314.8, 316.6, 317.1, 317.7

[56] References Cited

U.S. PATENT DOCUMENTS

| | | | |
|---|---|---|---|
| 4,088,805 | 5/1978 | Wiegand | 428/76 |
| 4,208,469 | 6/1980 | Dial | 428/314.4 |
| 4,274,158 | 6/1981 | Pogorski et al. | 428/71 |
| 4,598,506 | 7/1986 | Nohl et al. | 4/498 |
| 4,601,072 | 7/1986 | Aine | 4/498 |
| 4,798,756 | 1/1989 | Fukushima et al. | 428/247 |

*Primary Examiner*—William J. Van Balen
*Attorney, Agent, or Firm*—Roy E. Mattern, Jr.

[57] ABSTRACT

A spa/hot tub cover is structurally strong to essentially completely cover an opening of a spa/hot tub except for a limited vent, and withstand a person's weight. In so doing the spa/hot tub cover itself will not absorb vapor, moisture, or water, and thereby not become heavier because of the containment of moisture. The interior of the spa/hot tub cover has several barriers to any possible absorption of vapor, moisture, or water, whereby, if an outside or outer barrier is punctured, only a small quantity of vapor, moisture, or water, will be absorbed.

At a central portion of this cover, commencing from the top and continuing on down through to the bottom, the following layers of an overall lamination are: a top weatherable plastic; a contact cement serving as a sealant and adhesive; an expanded polystyrene shaped to define the shape of the spa/hot tub cover; a contact cement serving as a sealant and adhesive; a polypropylene scrim foil; a contact cement; a closed cell foam of polyethylene; and then a bottom polyester fabric reinforced polyvinylchloride. The laminations of this central portion continue on to the periphery of each spa/-hot tub cover. Where subsequent fasteners may be received, aluminum angles are selectively positioned about this periphery. The polypropylene scrim foil continues up and over the periphery of these laminations. The bottom polyester fabric reinforced polyvinylchloride also continues up alongside the periphery of these laminations. A vinyl angle is adhered about the top corner of the periphery of these laminations having a leg horizontally overlapping the periphery edge of the weatherable plastic and having a leg vertically overlapping the upturned portions of the polyester fabric reinforced polyvinylchloride. A sealing bead is located where the horizontal overlapping leg of the angle is positioned on the top weatherable plastic and where the vertical overlapping leg of the angle is positioned on the polyester fabric reinforced polyvinylchloride, thereby completing the assembly of this structurally strong, non vapor, non moisture absorbing, spa/hot tub cover. This cover in various embodiments has a sloping water draining top surface, has multiple sections, has hinges, has handles, and/or has gas spring actuators used during removal and replacement.

20 Claims, 2 Drawing Sheets

FIG. 3
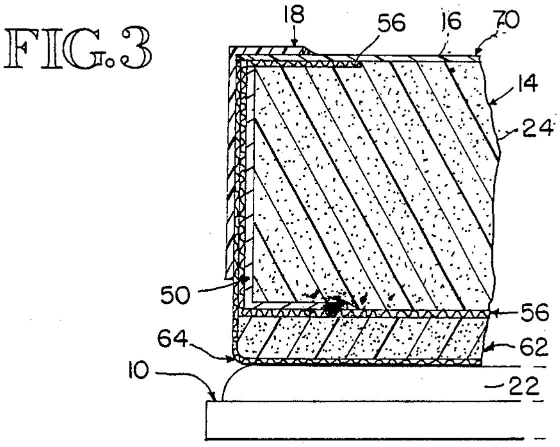
FIG. 4
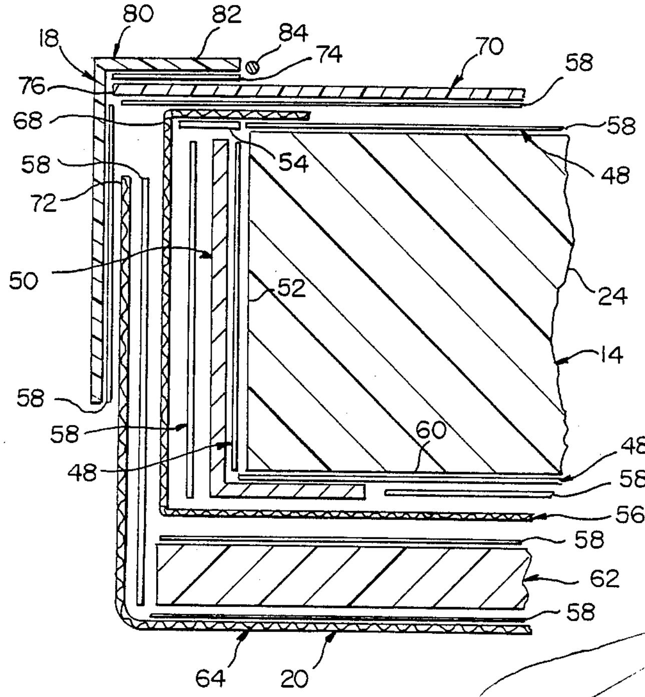
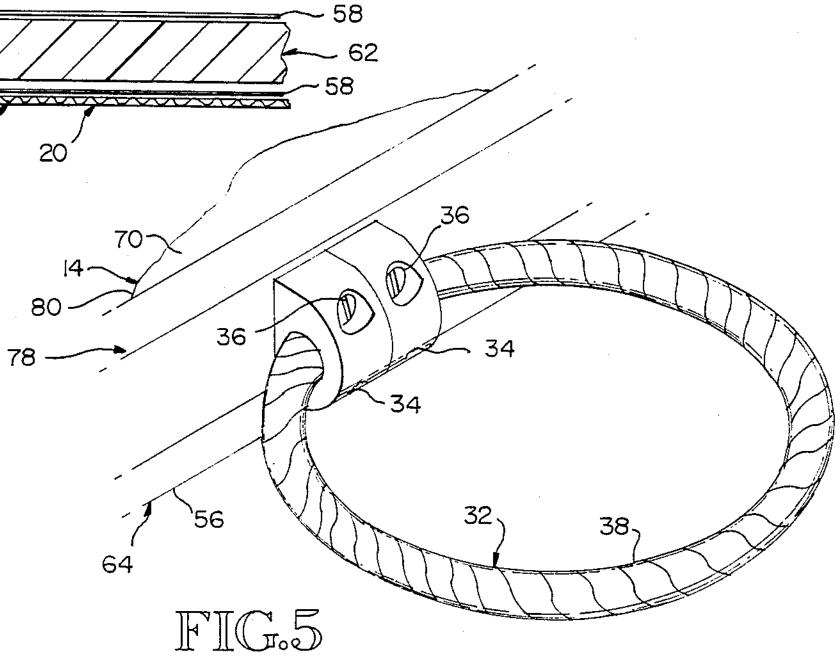
FIG. 5

STRUCTURALLY STRONG, NON VAPOR, NON MOISTURE ABSORBING, SPA/HOT TUB COVER

BACKGROUND

The growing popularity of having outdoor spas/hot tubs adjacent to or nearby dwellings, and the need to keep them well insulated at all times and especially during their in-between use times has resulted in the provision of many different types of removable covers. Beyond creating the insulation barrier, many of the covers are designed to serve other purposes such as keeping out debris, small animals, and small children.

Many materials have been used such as wood, metal and plastics and their combinations. Pre-shaped expanded polystyrene wrapped by plastic and covered by heat sealed joined vinyl materials serves as a spa/hot tub cover. Sprayed ethylene foam portions subsequently trimmed and similarly covered serves as a spa/hot tub cover.

Although these many prior types of spa/hot tub covers serve their purpose, there has remained a need for a spa/hot tub cover which is comparatively light weight, yet strong enough to support a person's weight, yet be relatively easily removed, and later easily replaced, easily cleaned, easily sealed about the top edge of a spa/hot tub, and be at all times especially resistant to any inward passage of moisture, vapor, or water, whereby the overall weight does not increase because of any containment of moisture, vapor, and/or water.

SUMMARY

A spa/hot tub cover is provided in various embodiments of size and shape having essentially one preferred arrangement of the overall laminated structure of each spa/hot tub cover. Each cover has several vapor, moisture, and water barriers to keep these moisture sources out, or in times of puncture or other damage, to keep the invasion of the moisture sources to a limited volume. Each cover is easily handled and maintained and serves extremely well to insulate the spa/hot tub, via an excellent seal and use of very good insulation materials, while at the same time, keeping debris out of the spa/hot tub, and preventing small animals and small children and grownups from falling into a covered spa/hot tub.

The basic overall shape of each spa/hot tub cover is first determined by the size of the spa/hot tub to be covered. Thereafter, a single unit or double unit of expanded polystyrene, often referred to as EPS, is cut to match the basic overall shape of each prospective spa/hot tub cover. The top surface is preferably cut to provide sloping surface portions for the quick drainage of collecting moisture and rain water. When double units of expanded polystyrene are used, they ultimately are preferably hinged together.

For further convenience, one of the double units of EPS is also hinged to structure adjacent to or on a spa/hot tub. In this way, some of the larger covers for the larger spas/hot tubs, using convenient handles, are first folded over. Then these folded over EPS sections are thereafter pivoted clear of the top opening of a spa/hot tub.

During such pivoting, a gas spring or gas springs supplement the lifting power of the user of the spa/hot tub. Subsequently, when the spa/hot tub cover is to be lowered over the spa/hot tub, the gas springs are again effective as assisting units, to help the spa/hot tub user recover his or her spa/hot tub.

Throughout each embodiment, as viewed in a cross section, commencing from the top of this spa/hot tub cover and down through to the bottom, the following layers of an overall lamination are a top weatherable plastic, a contact cement serving as a sealant and adhesive, an expanded polystyrene shaped to define the shape of the spa/hot tub cover, a contact cement serving as a sealant and adhesive, a polypropylene scrim foil, a contact cement, a closed cell foam of polyethylene, and then a bottom polyester fabric reinforced polyvinylchloride. The laminations of this central portion continue on to the periphery of each spa/hot tub cover. Where subsequent fasteners may be received, aluminum angles are selectively positioned about this periphery. The polypropylene scrim foil continues up and over the periphery of these laminations. The bottom polyester fabric reinforced polyvinylchloride also continues up alongside the periphery of these laminations. A vinyl angle is adhered about the top corner of the periphery of these laminations, having a leg horizontally overlapping the periphery edge of the weatherable plastic and having a leg vertically overlapping the upturned portions of the polyester fabric reinforced polyvinylchloride. A sealing bead is located where the horizontal overlapping leg of the angle is positioned on the top weatherable plastic and where the vertical overlapping leg of the angle is positioned on the polyester fabric reinforced polyvinylchloride, thereby completing the assembly of this structurally strong, non vapor, non moisture absorbing, spa/hot tub cover.

DRAWINGS

A preferred embodiment of the spa/hot tub cover is illustrated in the drawings, wherein:

FIG. 1 is a perspective view of the spa/hot tub cover in place over the spa/hot tub, which is surrounded by an auxiliary structure, with phantom lines and motion arrows indicating how the two piece embodiment is first folded using a central hinge and handles, and then the two folded together pieces, as a unit, are pivotally moved into an upright position clear of the top of the spa/hot tub, utilizing edge hinges secured to the auxiliary structure, and obtaining the assisting forces created upon movement of the gas springs;

FIG. 3 is a partial sectional view taken in the geometric plane indicated by line 3—3 in FIG. 2, showing the manufactured arrangement of all of the components of the principal laminated structure of the spa/hot tub cover, and indicating how the softer underside portions rest on the edge of the spa/hot tub to create an excellent seal;

FIG. 4 is a partial and enlarged exploded view showing how the manufactured components appear before their ultimate securement together, as shown in FIG. 3, and in so doing to indicate how many barriers are created to keep vapor, moisture, and/or water from entering the interior of the spa/hot tub cover, and if there is damage, allowing some penetration of vapor, moisture, and/or water, such penetration will be restricted; and FIG. 5 is an enlarged view of the preferred handles, which are derived by using two sailing rope fairleads and a portion of a rope, whose respective ends are passed through a respective fairlead and flared sufficiently to prevent their withdrawal.

DESCRIPTION OF A PREFERRED EMBODIMENT OF THE SPA/HOT TUB COVER

Regarding Spas/Hot Tubs

Figure 1:
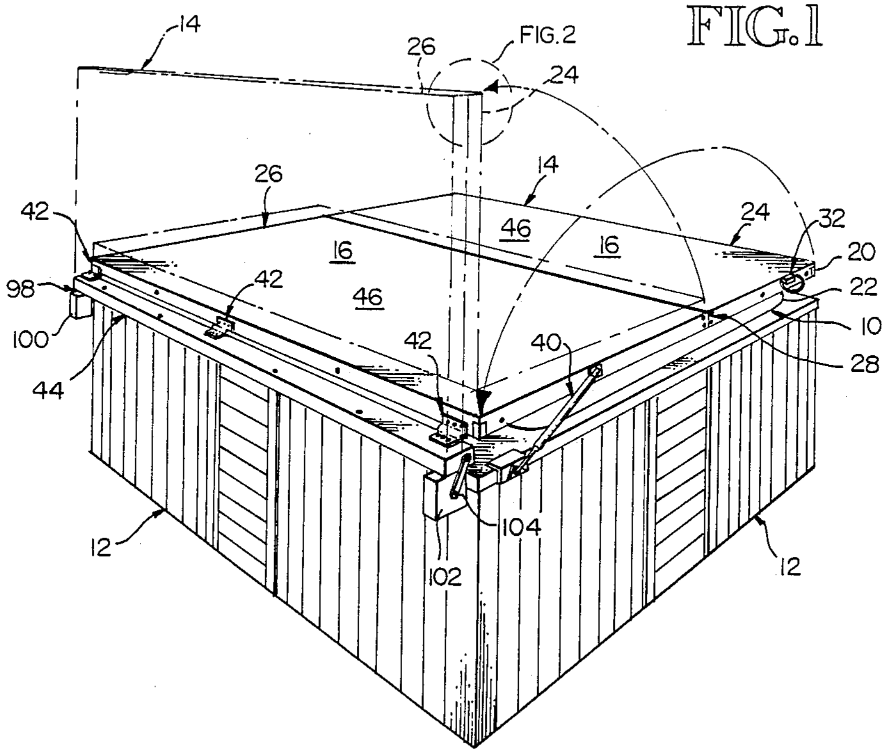

Spas/hot tubs are available in many sizes and shapes. They are also made of many different types of materials. In FIG. 1, a spa/hot tub 10 is illustrated which is large enough to hold at least two persons. It is made of materials which are contoured to conveniently receive bathers, and which present a smooth surface to the bathers and consequently to the water. Around the spa/hot tub 10 is an auxiliary structure 12 serving to position the spa/hot tub 10, the auxiliary equipment thereof, not shown, and also this preferred embodiment of the sp/hot tub cover 14.

The Appearance of This Preferred Embodiment of the Spa/hot Tub Cover

Figure 2:
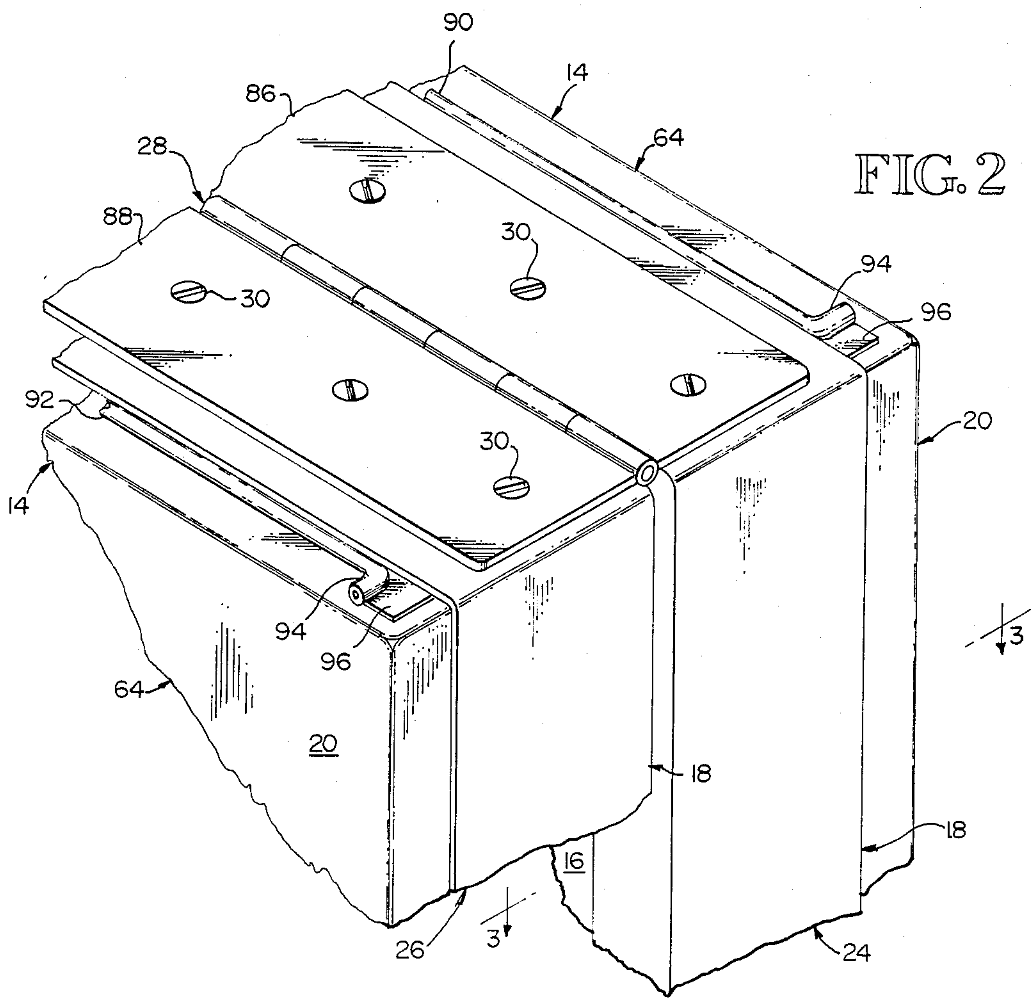
FIG. 2 is an enlarged partial sectional view of portions of the folded together pieces of the spa/hot tub cover which are located by the central hinge, to illustrate their external appearance, the central hinge, the adjacent seals, and the limited vent area formed by the adjacent seals.

As shown in FIGS. 1, 2, and 3, this preferred embodiment of the spa/hot tube cover 14 has a hard top surface 16 with protective surrounding angle 18 and a soft bottom surface 20, insuring a good seal about the top edge 22 of the spa/hot tub 10. For ease of handling the spa/-hot tub cover, two sections, portions, or pieces 24, 26 are used, which are joined together via a centrally located hinge 28 secured by fasteners 30. By first using the handles 32, one piece 24 of the spa/hot tub cover 14 is lifted and folded over the top of the other piece 26, utilizing the central hinge 28. As shown in FIG. 5, the handle 32 is preferably made by using a portion of a rope 36 and two rope fairleads 34, secured by fasteners 36. The ends of the rope 38, not shown, are respectively positioned in the respective rope fairleads 34, after these rope ends have been first passed through the fairleads and then flared outwardly to prevent their withdrawal.

After the spa/hot tub cover piece 24 has been rotated on top of the spa/hot tub cover piece 26, then they as a unit, are pivoted by the user of the spa/hot tub 10 to an upright position, as indicated in FIG. 1, by the motion arrows and phantom lines, utilizing the assisting gas springs 40, preferably located with one being at each side, and also utilizing the various spaced hinges 42, secured between the section 26 of the spa/hot tub cover 14 and the horizontal support 44 on the auxiliary structure 12.

The Preferred Laminated Structure of This Preferred Embodiment

FIG. 3 shows, via partial cross section, a portion of section 24 of the spa/hot tub cover 14, at the planar location at section 3—3 of FIG. 2. The construction of this laminated structure is like the construction throughout this preferred embodiment. To better understand this construction, the enlarged exploded view of FIG. 4 is arranged in like orientation.

During the manufacture of this spa/hot tub cover, the overall shape thereof is first created by cutting portions of expanded polystyrene, referred to as EPS, using heated positioned wires that move relative to passage of an elongated large rectangular shaped portion of EPS. Preferably, at least one cutting heated wire is arranged on a bias, so the subsequently positioned bias cut surface presents a sloping top surface 46 of the resulting piece 24 or 26 of the spa/hot tub cover 14.

Each EPS formed section or piece 24, 26 is thereafter thoroughly and completely covered by applying a polychloroprene contact cement. This applied contact cement dries creating a vapor, moisture, and water barrier or lamination 48, completely protecting the EPS from any entry of vapor, moisture, and/or water. Such a contact cement is one of the "scotch-grip" products of "3M" designated as "Fastbond 30". However, it is initially and principally applied as a moisture barrier, and not as a contact cement, as shown in FIGS. 3 and 4.

Wherever a metal, such as the hinge fasteners 30, or the handle fasteners 36, are to be used to secure hinges and handles to the spa/hot tub cover, then a necessary length of an aluminum angle 50 is adhered to the coated EPS, as shown in FIGS. 3 and 4. In the embodiment illustrated in FIG. 1, the aluminum angle 50 will be located and adhered along the respective sides 52 of pieces 24, 26, where the central hinge 28 is to be secured, where the handles 32 are to be secured, and where the gas springs 40 or pneumatic springs 40 are to be secured.

After an application of a contact cement 58, used as an adhesive, on the continuous polypropylene scrim foil 56, this foil 56 is applied across the entire bottom 60 of a respective EPS piece 24 or 26 and is wrapped up around all sides 53 of either piece 24 or 26, and over the top edges of the EPS. This foil 56 is very strong and substantially adds to the overall strength of the completed spa/hot tub cover 14. Such a foil is available under the "Lamotite" trademark. There are combined laminations of a 0.0003 inch aluminum foil, a 4 inch by 4 inch fiberglass scrim reinforcement, a flame resistant adhesive, and a film of 0.0015 inch white polypropylene.

To create a softer underside or soft bottom 20 to seal around the top edge 22 of a spa/hot tub 10 and to provide better possible human contact, a continuous closed cell foam of polyethylene 62, after the selected use of a contact cement 58, is extended and secured entirely underneath the continuous polypropylene scrim foil 56, as shown in FIGS. 3 and 4. This foil 56 was previously placed on the bottom 60 of sections 24, 26 of the spa/hot tub cover 14.

To continue to create a softer underside or soft bottom 20 of the spa/hot tub cover 13, a continuous thermally stable and gas impermeable polyvinylchloride polyester laminate 64, after the selected use of a contact cement 58 and/or release tape, is extended entirely underneath the continuous closed cell foam 62, and up along all sides 52 of the EPS piece 24 or 26 of the spa/-hot tub cover 14, which has previously been covered by the barrier 48 of contact cement 58, aluminum angles 50 in places, and the polypropylene scrim foil 56, as shown in FIG. 4. One laminate material to serve as this outer laminate 64 on this softer bottom surface 20, is a PVC laminate referred to by the "Herculite" trademark.

Across the entire hard top surface 16 of the EPS piece 24 or 26 of the spa/hot tub cover 14, previously covered by the barrier 48 of dried contact cement 58, and by the turned over edges 68 of the polypropylene scrim foil 56, a continuous weatherable plastic 70, preferably wiped with methylene chloride, not shown, is then sprayed with contact cement and placed on the barrier 48 and the turned over edges 68 of the foil 56, as shown in FIG. 4, to form the hard top surface 16 of the spa/hot tub cover 14. One laminate material to serve as this continuous weatherable plastic 70, is referred to by the "ROVEL" trademark .

As illustrated in FIG. 4, a compatible adhesive, such as cyanoacrylate instant adhesive 74 is then applied around the peripheral top side portions 76 of the continuous weatherable plastic 70, located over the like positioned portions of the EPS piece 24 or EPS piece 26. Then a continuous plastic protective angle 18, preferably of a PVC vinyl, is located around this top edge 80 of the spa/hot tub cover 14 and then the top flange 82 thereof is pressed into contact with the compatible super glue 74, to complete this protection about this top edge 80 of the spa/hot tub cover 14.

To insure there will not be any passage of vapor, moisture, or water between this plastic angle 18, in respect to the top flange or leg 82 thereof, and the continuous weatherable plastic 70, and in respect to the vertical flange or leg 82, and the fabric 64, a sealing bead 84 is continuously created, as shown in FIG. 4, at the terminus of the top flange or leg 82, remaining in contact both with the plastic angle 18 and with the continuous weatherable plastic 70 and at the terminus of the vertical flange or leg 83, remaining in contact with both the plastic angle 18 and the fabric 64. A preferred sealing bead 84 is made by placing the starting components of an otherwise later formed laminate, such as a "ROVEL" trademark identified laminate, in a solution of methylene chloride, creating a bead producing liquid applied by using a selected dispenser, not shown. At the conclusion of the placement of this sealing bead 84, the spa/hot tub cover 14 is almost complete.

As shown in FIGS. 1, 2, and 5, other components are selectively added. If the spa/hot tub cover 14 is made of two pieces 24, 26, they are joined by using a hinge 28, hinge fasteners 30, and the earlier placement of portions of aluminum angles 50.

Nearby each arm or leg 86 or 88 of the hinge 28, are like continuous sealing gaskets 90, 92, adhered in place, which when the spa/hot tub cover 14 is in place over a spa/hot tub 10, contact one another to create and to complete a full weather seal along this central hinge 28. As shown in FIG. 2, these sealing gaskets 90, 92, at their respective ends, are turned at ninety degrees, creating turned down portions 94. Therefore, adjacent each turned down portion 94, an air vent 96 is intentionally created, insuring there will not be a significant build up of any possible suction holding pressure, making the removal of the spa/hot tub cover 14 initially very difficult.

In addition to the mounting of the hinge 28, handles 32 are selectively located and secured, where aluminum angles 50 have been previously located. Then, as shown in FIG. 1, spaced hinges 42 are selectively located and secured, where aluminum angles 50 have been previously located, in piece 26 of the spa/hot tub cover 14. These spaced hinges 42, in turn are secured to the horizontal support 44 of the auxiliary structure 12. Thereafter, as needed, gas springs 40 are located and secured where the aluminum angles 50 have been previously located, and they are extended and secured at their opposite ends to the auxiliary structure 12, to complete the installation, illustrated in FIG. 1, of this preferred embodiment of the spa/hot tub cover 14 on the spa/hot tub 10.

With the exercise of reasonable care this spa/hot tub cover 14 will remain as a full insulating and strong cover, which will not gain weight by the absorption of vapor, moisture or water, and at all times the removal of the spa/hot tub cover 14 will be conveniently undertaken. Although a particular embodiment has been illustrated, other embodiments are available such as a single piece embodiment. In respect to all embodiments, if there are accidental punctures of this spa/hot tub cover 14, the various sealing materials and barriers will limit the penetration of vapor, moisture, and/or water, and the cover 14 should continue on with a long lasting operational life. Moreover, the materials used may be patched conveniently to restore the materials and barriers that stop the unwanted penetration of vapor, moisture, and water.

I claim:

1. A structurally strong, non vapor, non moisture absorbing, spa/hot tub cover, comprising the assembled combination of laminations of materials, adhesives, sealants, and both aluminum and plastic angle reinforcements arranged as follows:

(a) an overall shape defining volume of expanded polystyrene cut or formed as a cover to match the respective top planar opening of a particular spa/hot tub;

(b) a complete surrounding layer of contact cement adhered to all the surfaces of the expanded polystyrene and dried to become an impervious vapor, moisture, and water, barrier to keep the expanded polystyrene dry;

(c) selected lengths of aluminum angle placed at selected places about the periphery of the expanded polystyrene and adhered thereto to serve as places to receive fasteners, later selected to hold in place selected items such as handles and hinges;

(d) a continuous polypropylene scrim foil adhered to and extending throughout the entire bottom, entire sides, and entire peripheral top edges of the expanded polystyrene, being secured by contact cement;

(f) a continuous closed cell foam of polyethylene extending entirely underneath the continuous polypropylene scrim foil and adhered thereto in selected places;;

(g) a continuous thermally stable and gas impermeable polyvinylchloride polyester laminate extending entirely underneath the continuous closed cell foam, and entirely up and alongside the side edges of the continuous closed cell foam and the side edges of the continuous polypropylene scrim foil, and adhered thereto;

(h) a continuous weatherable plastic extending entirely over the contact cement coated overall shape defining volume of expanded polystyrene, the top edge of aluminum angles, the folded over edge of the continuous polypropylene scrim foil, and adhered to all of them;

(i) A cyanoacrylate instant adhesive spread near all the edges of the continuous weatherable plastic;

(j) a plastic angle positioned about all the top and side edges of the continuous weatherable plastic and adhered thereto via the cyanoacrylate instant adhesive, and about the top and side portions of the upturned portions of the continuous thermally stable and gas impermeable polyvinylchloride polyester laminate and adhered thereto via the cyanoacrylate instant adhesive; and (k) a continuous sealing bead of a weatherable plastic in an applying solution of methylene chloride located where the plastic angle stops above the continuous weatherable plastic and where the plastic angle stops by the polyester reinforced laminate, to create a vapor, moisture, and water seal.

2. A structurally strong, non vapor, non moisture absorbing spa/hot tub cover, as claimed in claim 1, wherein the overall shape defining volume of expanded polystyrene has a sloping top surface eliminating a possibility of standing water on this completed cover.

3. A structurally strong, non vapor, non moisture absorbing, spa/hot tub cover, as claimed in claim 1, wherein the overall shape defining volume of expanded polystyrene is made in two pieces and hinges are used to join the two pieces together.

4. A structurally strong, non vapor, non moisture absorbing spa/hot tub cover, as claimed in claim 2, wherein the overall shape defining volume of expanded polystyrene is made in two pieces and hinges are used to join the two pieces together.

5. A structurally strong, non vapor, non moisture absorbing, spa/hot tub cover, as claimed in claim 1, wherein the continuous weatherable plastic is a composition of styrene-acrylonitrile copolymers.

6. A structurally strong, non vapor, non moisture absorbing, spa/hot tub cover, as claimed in claim 1, wherein before the continuous weatherable plastic is adhered in place, the underside surface thereof is wiped with methylene chloride and then sprayed with a contact cement.

7. A structurally strong, non vapor, non moisture absorbing, spa/hot tub cover, as claimed in claim 1, has a gas spring accessory used during the removal thereof from the top of a spa/hot tub.

8. A structurally strong, non vapor, non moisture absorbing, spa/hot tub cover, as claimed in claim 2, has a gas spring accessory used during the removal thereof from the top of a spa/hot tub.

9. A structurally strong, non vapor, non moisture absorbing, spa/hot tub cover, as claimed in claim 3, has a gas spring accessory used during the removal thereof from the top of a spa/hot tub.

10. A structurally strong, non vapor, non moisture absorbing, spa/hot tub cover, as claimed in claim 4, has a gas spring accessory used during the removal thereof from the top of a spa/hot tub.

11. A structurally strong, non vapor, non moisture absorbing, spa/hot tub cover, as claimed in claim 3, wherein each piece has a gasket which extends along the hinges joining the two pieces together.

12. A structurally strong, non vapor, non moisture absorbing, spa/hot tub cover, as claimed in claim 4, wherein each piece has a gasket which extends along the hinges joining the two pieces together.

13. A structurally strong, non vapor, non moisture absorbing, spa/hot tub cover, as claimed in claim 11, wherein the ends of each gasket are formed to provide a vent, so a vacuum will not form under the spa/hot tub cover when the spa/hot tub is covered.

14. A structurally strong, non vapor, non moisture absorbing, spa/hot tub cover, as claimed in claim 12, wherein the ends of each gasket are formed to provide a vent, so a vacuum will not form under the spa/hot tub cover when the spa/hot tub is covered.

15. A structurally strong, non vapor, non moisture absorbing, spa/hot tub cover, as claimed in claim 1, comprising, in addition, at least one handle to be used in raising and lowering this spa/hot tub cover, which is secured at an aluminum angle location along the side of this cover.

16. A structurally strong, non vapor, non moisture absorbing, spa/hot tub cover, as claimed in claim 15, wherein the handle, in turn, comprises:

(a) a portion of rope having ends;
(b) two fairleads each receiving an end of the rope;
(c) fasteners to secure the fairleads to the side of the spa/hot tub cover; and
(d) radially expanded portions of the rope ends being formed, following their passage through a respective fairlead, to thereby insure these rope ends will not pull back through the fairleads, thereby completing the assembly of the handle.

17. A structurally strong, non vapor, non moisture absorbing, spa/hot tub cover, as claimed in claim 13, comprising, in addition, at least one handle, in turn comprising:

(a) a portion of rope having ends;
(b) two fairleads each receiving an end of the rope;
(c) fasteners to secure the fairleads to the side of the spa/hot tub cover; and
(d) radially expanded portions of the rope ends being formed, following their passage through a respective fairlead, to thereby insure these rope ends will not pull back through the fairleads, thereby completing the assembly of the handle.

18. A structurally strong, non vapor, non moisture absorbing, spa/hot tub cover, as claimed in claim 14, comprising, in addition, at least one handle, in turn comprising:

(a) a portion of rope having ends;
(b) two fairleads each receiving an end of the rope;
(c) fasteners to secure the fairleads to the side of the spa/hot tub cover; and
(d) radially expanded portions of the rope ends being formed, following their passage through a respective fairlead, to thereby insure these rope ends will not pull back through the fairleads, thereby completing the assembly of the handle.

19. A structurally strong, non vapor, non moisture absorbing, spa/hot tub cover, comprising the assembled combination of laminations of materials, adhesives, sealants arranged as follows:

(a) an overall shape defining volume of expanded polystyrene cut or formed as a cover to match the respective top planar opening of a particular spa/-hot tub;
(b) a complete surrounding layer of contact cement adhered to all the surfaces of the expanded polystyrene and dried to become an impervious vapor, moisture, and water, barrier to keep the expanded polystyrene dry;
(c) a continuous polypropylene scrim foil adhered to and extending throughout the entire bottom, entire sides, and entire peripheral top edges of the expanded polystyrene, being secured by contact cement;
(d) a continuous closed cell foam of polyethylene extending entirely underneath the continuous polypropylene scrim foil and adhered thereto;
(e) a continuous thermally stable and gas impermeable polyvinylchloride polyester laminate extending entirely underneath the continuous closed cell foam, and entirely up and alongside the side edges of the continuous closed cell foam and the side edges of the continuous polypropylene scrim foil, and adhered thereto;
(f) a continuous weatherable plastic extending entirely over the contact cement coated overall shape defining volume of expanded polystyrene, the folded over edge of the continuous polypropylene scrim foil, and the top edge of the thermally stable and gas impermeable polyvinylchloride polyester laminate, and adhered to all of them; and (g) a continuous sealing bead of a weatherable plastic in an applying solution of methylene chloride located where the continuous weatherable plastic terminates to create a vapor, moisture, and water seal.

20. A structurally strong, non vapor, non moisture absorbing, spa/hot tub cover, comprising the assembled combination of laminations of materials, adhesives, sealants, arranged as follows:

(a) an overall shape defining volume of expanded polystyrene cut or formed as a cover to match the respective top planar opening of a particular spa/-hot tub;

(b) a complete surrounding layer of contact cement adhered to all the surfaces of the expanded polystyrene and dried to become an impervious vapor, moisture, and water, barrier to keep the expanded polystyrene dry;

(c) a continuous polypropylene scrim foil adhered to and extending throughout the entire bottom, entire sides, and entire peripheral top edges of the expanded polystyrene, being secured by contact cement;

(d) a continuous closed cell foam of polyethylene extending entirely underneath the continuous polypropylene scrim foil and adhered thereto;

(e) a continuous thermally stable and gas impermeable polyvinylchloride polyester laminate extending entirely underneath the continuous closed cell foam, and entirely up and alongside the side edges of the continuous closed cell foam and the side edges of the continuous polypropylene scrim foil, and adhered thereto; and (f) a continuous weatherable plastic extending entirely over the contact cement coated overall shape defining volume of expanded polystyrene, and the folded over edge of the continuous polypropylene scrim foil, and adhered to them.

* * * * *